United States Patent
Kruzel

(10) Patent No.: US 11,323,051 B2
(45) Date of Patent: May 3, 2022

(54) PAINT SPRAYER WITH DYNAMIC PULSE WIDTH MODULATION DRIVEN MOTOR

(71) Applicant: Graco Minnesota Inc., Minneapolis, MN (US)

(72) Inventor: Tyler J. Kruzel, Otsego, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 16/476,955

(22) PCT Filed: Jan. 15, 2018

(86) PCT No.: PCT/US2018/013711
§ 371 (c)(1),
(2) Date: Jul. 10, 2019

(87) PCT Pub. No.: WO2018/132790
PCT Pub. Date: Jul. 19, 2018

(65) Prior Publication Data
US 2019/0356253 A1 Nov. 21, 2019

Related U.S. Application Data

(60) Provisional application No. 62/446,487, filed on Jan. 15, 2017.

(51) Int. Cl.
*H02P 6/14* (2016.01)
*H02P 8/16* (2006.01)
(Continued)

(52) U.S. Cl.
CPC .............. *H02P 7/29* (2013.01); *B05B 9/0861* (2013.01); *H02M 7/219* (2013.01); *H02P 7/05* (2016.02)

(58) Field of Classification Search
CPC ............ H02H 7/0852; H02P 6/12; H02P 1/28
See application file for complete search history.

(56) References Cited

U.S. PATENT DOCUMENTS 5,126,642 A 6/1992 Shahrodi
6,259,220 B1 * 7/2001 Hays ...................... F04B 49/065
318/481
(Continued)

FOREIGN PATENT DOCUMENTS

CN 102460947 A 5/2012
CN 103752442 A 4/2014
(Continued)

OTHER PUBLICATIONS

International Preliminary Report on Patentability for PCT Application No. PCT/US2018/013711, dated Jul. 16, 2019, pp. 11.
(Continued)

*Primary Examiner* — Muhammad S Islam
*Assistant Examiner* — Charles S Laughlin
(74) *Attorney, Agent, or Firm* — Kinney & Lange, P.A.

(57) ABSTRACT

A fluid sprayer includes a housing, a pump, a nozzle, a high voltage direct current (HVDC) brushed electric motor that drives the pump, and a motor controller electrically connected to the motor. The motor controller drives the motor with a high speed pulse width modulated (PWM) drive signal that switches current through the motor on and off. The motor controller varies the PWM signal as a function of a spray setting input and sensed current through the motor.

20 Claims, 4 Drawing Sheets

(51) Int. Cl.
*H02P 7/29* (2016.01)
*H02P 7/03* (2016.01)
*B05B 9/08* (2006.01)
*H02M 7/219* (2006.01)

(56) References Cited

U.S. PATENT DOCUMENTS

| | | |
|---|---|---|
| 7,012,393 B2 | 3/2006 | De Frutos et al. |
| 7,330,004 B2 | 2/2008 | DeJonge et al. |
| 7,498,755 B2 | 3/2009 | Julicher et al. |
| 2004/0007631 A1 | 1/2004 | Williams et al. |
| 2007/0007918 A1 | 1/2007 | Watts et al. |
| 2007/0020108 A1* | 1/2007 | Walls ............... F04B 49/022 417/44.2 |
| 2007/0258174 A1 | 11/2007 | Yamamoto et al. |
| 2008/0217437 A1 | 9/2008 | Vanden Berghe et al. |
| 2008/0258663 A1 | 10/2008 | Walls |
| 2010/0322795 A1* | 12/2010 | Jones ............... H02P 25/032 417/415 |
| 2011/0240758 A1 | 10/2011 | Robens et al. |
| 2013/0277455 A1 | 10/2013 | Thompson et al. |
| 2014/0340008 A1 | 11/2014 | Reynolds et al. |
| 2015/0022129 A1 | 1/2015 | Lu et al. |
| 2015/0209497 A1* | 7/2015 | Aalders ............... A61M 1/75 604/514 |
| 2015/0222205 A1 | 8/2015 | Suda |
| 2015/0229254 A1 | 8/2015 | Hernandez et al. |
| 2016/0072415 A1 | 3/2016 | Wallimann et al. |
| 2016/0087560 A1* | 3/2016 | Miller ............... H02P 6/28 318/400.03 |
| 2017/0297045 A1* | 10/2017 | Anderson ............ B05B 9/0413 |

FOREIGN PATENT DOCUMENTS

| | | |
|---|---|---|
| JP | 2003144985 A | 5/2003 |
| JP | 4549425 B1 | 9/2010 |
| JP | 5584088 B2 | 9/2014 |

OTHER PUBLICATIONS

International Search Report and Written Opinion for International Application No. PCT/US18/13711 dated Apr. 26, 2018, 15 pages.
Extended European Search Report for EP Application No. 18738674.3, dated Oct. 1, 2020, pp. 8.
First Chinese Office Action for CN Application No. 2018800067385, dated Sep. 4, 2020, pp. 18.
Second Chinese Office Action for CN Application No. 2018800067385, dated May 31, 2021, pp. 18.
Chinese Rejection for CN Application No. 2018800067385, dated Sep. 27, 2021, pp. 14.

* cited by examiner

PAINT SPRAYER WITH DYNAMIC PULSE WIDTH MODULATION DRIVEN MOTOR

CROSS-REFERENCE TO RELATED APPLICATION(S)

This application claims the benefit of U.S. Provisional Application No. 62/446,487 filed Jan. 15, 2017 for "PAINT SPRAYER WITH DYNAMIC PULSE WIDTH MODULATION DRIVEN MOTOR" by Tyler J. Kruzel. The aforementioned U.S. Provisional Application No. 62/446,487 is hereby incorporated by reference in its entirety.

BACKGROUND

In most high voltage direct current brushed (HVDC) motor controllers in paint sprayer applications, use silicon controlled rectifiers (SCRs) or Triacs due to their simplistic and inexpensive control design. In a typical application circuit of a design using an AC to DC rectifying bridge and a Triac to drive a high voltage direct current (HVDC) brushed motor. This motor control strategy yields very high peak currents, for example, around 7.3 Arms (root mean square Amperes) that decay down to 0 Arms valleys every 8.3 ms in a 120 VAC 60 Hz power distribution system. As a result, motor brush life can be negatively affected or impacted, and operation of the sprayer can be affected by motor thermal trips caused by overheating.

SUMMARY

A fluid sprayer includes a housing, a pump, a nozzle, a high voltage direct current (HVDC) brushed electric motor that drives the pump, and a motor controller electrically connected to the motor. The motor controller drives the motor with a high speed pulse width modulated (PWM) drive signal that switches current through the motor on and off.

DETAILED DESCRIPTION

In this disclosure a variable output single phase high voltage (HVDC) brushed motor controller for paint sprayers (or other fluid sprayers) is described. This motor controller commutates a brushed motor that will drive a pump in a paint sprayer. The motor controller eliminates motor thermal trips, increases the existing motor's brush life, and provides high resolution variable output adjustment for the painter. The controller also increases motor efficiency to make it capable of driving three piston pump with low Arms.

Various embodiments of the present disclosure can be used to spray paint and/or other fluids and solutions. While paint will be used herein as an exemplar, it will be understood that this is merely one example and that other fluids (e.g., water, oil, stains, finishes, coatings, solvents, etc.) can be sprayed instead of paint.

Figure 1A:
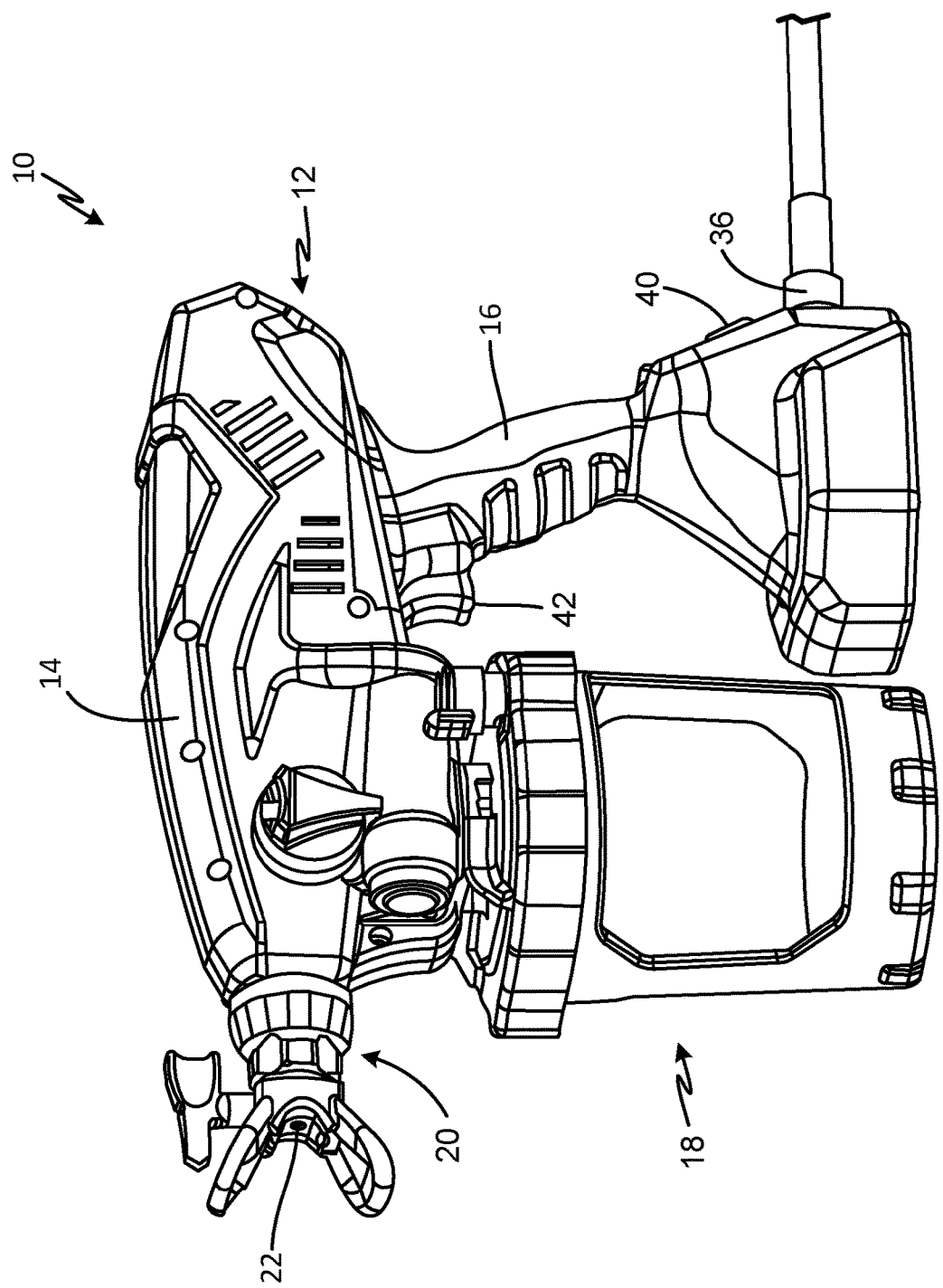
FIG. 1A is a perspective view of a handheld paint sprayer.
Figure 1B:
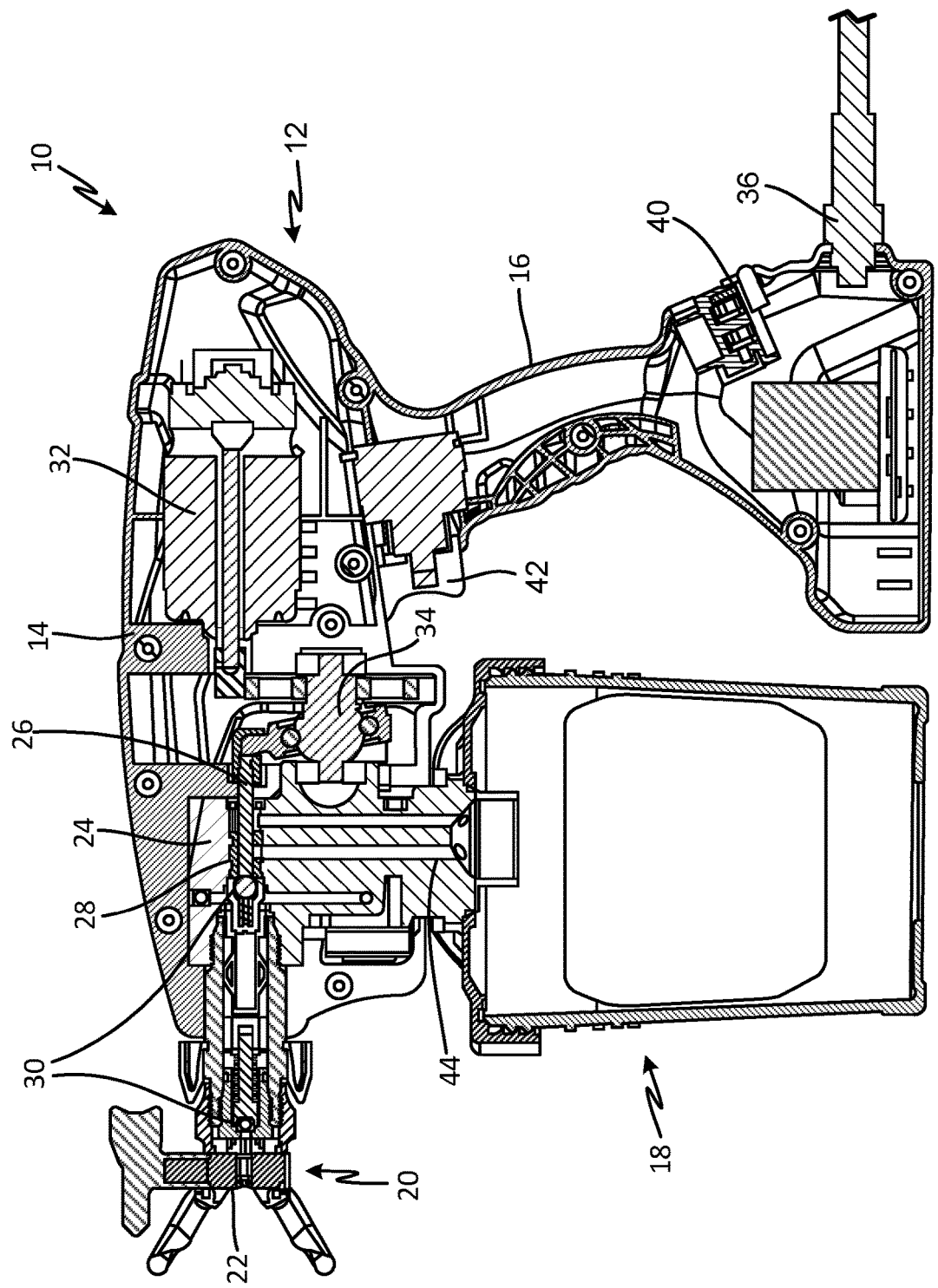
FIG. 1B is a cross-sectional view of the handheld paint sprayer.

FIG. 1A is a perspective view, and FIG. 1B is a cross-sectional view of sprayer 10. FIGS. 1A and 1B will be discussed together. Sprayer 10 shown in FIGS. 1A and 1B is a handheld paint sprayer that can be supported and operated with just one hand during spraying. As shown in FIGS. 1A and 1B, sprayer 10 includes housing 12 (which includes main body 14 and handle 16), fluid supply system 18, spray tip assembly 20 (which includes nozzle 22), pump 24 (which includes pistons 26 and cylinders 28), valves 30, motor 32, wobble drive 34, power cord 36, motor controller 38, spray setting input 40, and trigger 42.

It will be understood that this is but one type of sprayer within which the features of the present disclosure could be embodied. The features of the present disclosure could be practiced on larger, non-handheld sprayers. For example, the features of the present disclosure could be implemented in a professional-grade floor unit.

Fluid supply system 18 is a reservoir that can be used to hold the paint to be sprayed, such as by holding the paint in a flexible polymer container. The paint is sprayed out of nozzle 22 of spray tip assembly 20. Nozzle 22 can be a carbide orifice at the end of the fluid pathway that atomizes paint into a fan spray pattern for painting surfaces. The mechanism (pump 24, valves 30, motor 32, and wobble drive 34) for pumping the paint from the fluid supply system 18 and out nozzle 22 is contained within main body 14 of housing 12. Housing 12 can be, for example, a molded polymer clamshell.

Trigger 42 is located at an upper end of handle 16. When activated, trigger 42 causes sprayer 10 to spray paint, and when deactivated trigger 42 causes the sprayer 10 to stop spraying paint. While trigger 42 is shown in this embodiment, it will be appreciated that other types of inputs or activators can instead be used for commanding sprayer 10 to spray paint.

Sprayer 10 can develop different levels of pressure for expelling the paint from nozzle 22 depending on spray setting input 40. Spray setting input 40 can be a potentiometer dial, a digital input, slider, one or more buttons, or other type of input. Generally, the user can turn the spray setting input 40 to a higher level for greater pressure and a lower level for lower pressure. The flow of paint, and in particular the pattern of the atomized spray fan, is dependent on the fluid pressure.

Sprayer 10 receives AC input power from power cord 36, which connects to a conventional electrical wall outlet. The AC input power provides power to motor 32 and motor controller 38 of sprayer 10. Motor controller 38 can be entirely or partially mounted on a circuit board. Motor controller 38 controls operation of sprayer 10. In particular, motor controller 38 receives an on/off input from the trigger 42, a spray setting from spray setting input 40, and AC power from power cord 36. Using these inputs, motor controller 38 controls operation of motor 32, which drives pump 24 through wobble drive 34.

Motor 32 is contained within main body 14 of housing 12. Motor 32 can be, for example, a high voltage brushed DC electric motor. Rotational output from motor 32 operates wobble drive 34 which converts the rotational output into linear reciprocal motion. While a wobble drive 34 is shown to convert rotational motion into linear reciprocal motion, alternative mechanisms can instead be used, such as various yokes and/or cranks.

The reciprocal motion is used to operate pump 24. Pump 24 includes a housing within which pistons 26 reciprocate. While only one piston is shown in the view of FIG. 1B, in one embodiment two other pistons are located within pump 24 and operate similarly. However, different embodiments may only have two pistons or a single piston (e.g., non-handheld floor units can have a single, larger piston). Pistons 26 are located at least partially within cylinders 28 of pump 24. Pistons 26 and cylinders 28 can be formed from carbide, amongst other options.

The reciprocating motion of each piston 26 pulls paint from fluid supply system 18 through the intake channel 44 and then into a chamber formed by cylinder 28 and piston 26 on an upstroke (or back stroke), and then expels the paint under pressure from the chamber on the downstroke (or forward stroke). The paint passes through one or more valves 30. Under pressure from the pump 24, the paint flows to nozzle 22 for release as an atomized spray fan. In floor units, the paint may travel through a flexible hose after being placed under pressure by the pump and released through a separate mechanical gun to which the flow fluidly connects.

Preferably, sprayer 10 is responsive, consistent, reliable, and lightweight. However, these can be competing considerations. When a user presses trigger 42 or otherwise activates motor 32, a fine atomization of paint in an even fan pattern is expected to quickly be output (e.g., within 100 milliseconds) and maintained for the duration of trigger pull of trigger 42. This requires that motor 32 accelerate very quickly. A smaller motor is also preferred to reduce weight, but is less capable of fast acceleration to high pressure. These competing demands risk several complications, such as ring fire and overheating, which are further discussed herein.

Figure 2:
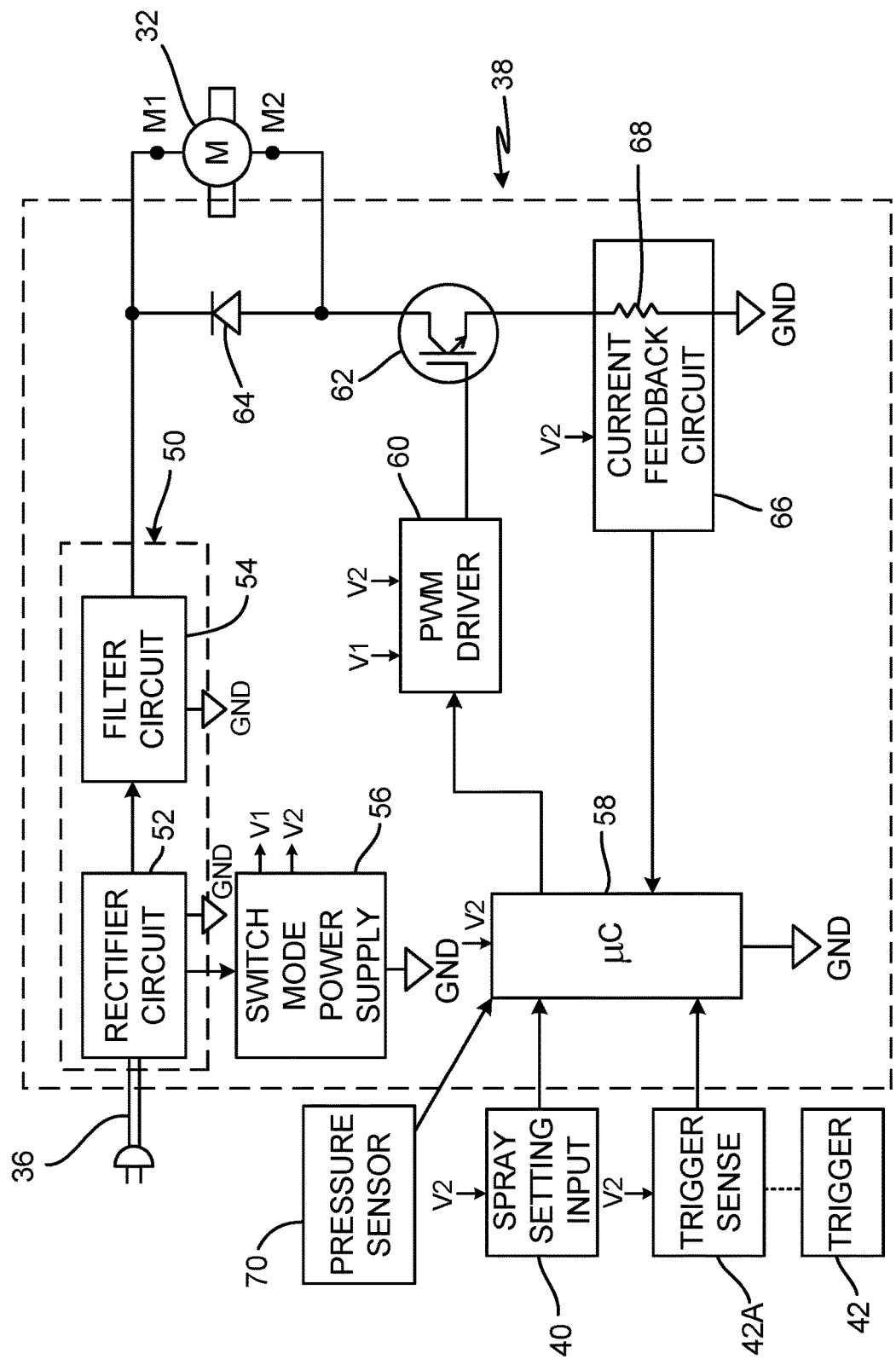
FIG. 2 is an electrical block diagram of the handheld paint sprayer.

FIG. 2 shows a block diagram of some of the circuitry of sprayer 10. FIG. 2 shows high voltage direct current (HVDC) brushed motor 32, power cord 36, motor controller 38, spray setting input 40, trigger 42, and trigger sense circuit 42A. Motor controller 38 includes HVDC power supply 50 (which includes rectifier circuit 52 and filter circuit 54), switch mode power supply 56, microcontroller 58, pulse width modulation (PWM) driver 60, semiconductor switch 62, flyback diode 64, current feedback circuit 66 (which includes current sense resistor 68), and pressure sensor 70.

Motor controller 38 is powered by standard line (or mains) power received from power cord 36 (e.g., a 120 volt 60 Hertz AC, or a 230 volt 50 Hertz AC, or other regionally standard line power). The AC power from power cord 36 is converted to a DC voltage of, for example, 165 volts, by HVDC power supply 50. Rectifier circuit 52 receives the AC power from power cord 36 and full wave rectifies the power to produce rectified power. Filter circuit 54 conditions or smoothes the rectified power to create, the DC voltage (e.g. 165 volts) that is supplied to terminal M1 of motor 32.

Switch mode power supply 56 receives rectified power from HVDC power supply 50 and generates supply voltages V1 and V2. All of the voltages share a common ground in the circuitry shown in FIG. 2. Supply voltage V1, which in one embodiment is 15 VDC, is used by PWM driver 60 to produce a PWM drive signal that turns semiconductor switch 62 on and off. Supply voltage V2, which in one embodiment is 3.3 VDC, powers microcontroller 58, spray setting input 40, trigger sense circuit 42A, PWM driver 60, and current feedback circuit 66.

Microcontroller 58 receives inputs from spray setting input 40, trigger sense circuit 42A, and current feedback circuit 66. Based upon those inputs, microcontroller 58 outputs a PWM command signal to PWM driver 60. In one embodiment, the PWM command signal has a frequency of 16 kHz for in rush current during a starting sequence and a frequency of 32 kHz for steady state current during a steady state phase of sprayer operation. Microcontroller 58 determines the duty cycle of the command signal, and thus the on and off time of the semiconductor switch 62 based upon the phase of operation, a spray setting input, and sensed current.

The PWM drive signal from PWM driver 60 is supplied to semiconductor switch 62, which is shown in FIG. 2 as an isolated gate bipolar transistor (IGBT). IGBT switch 62 has a control electrode (gate), a first main current carrying electrode (collector), and a second main current carrying electrode (emitter). IGBT switch 62 turns on and off in response to the PWM drive signal received at its gate.

Motor terminal M2 is connected to the collector of IGBT switch 62. The emitter of IGBT switch 62 is connected to current sense circuitry 66. Flyback diode 64 is connected in parallel with motor 32. The anode of flyback diode 64 is connected to motor terminal M2, and the cathode of flyback diode 64 is connected to motor terminal M1.

When IGBT switch 62 is turned on, a current path is established through motor 36, IGBT switch 62, and current sense resistor 68 to ground. The HVDC voltage at motor terminal M1 causes current to flow through motor 32 to motor terminal M2, from collector to emitter of IGBT switch 62 and through current sense resistor 68. When IGBT switch 62 is turned off, the HVDC voltage is still present at motor terminal M1, but current flow through, IGBT switch 62 is interrupted. Flyback diode 64 conducts motor current from terminal M2 back to terminal M1 when IGBT switch 62 turns off.

Microcontroller 58 can include, among other things, a digital processor and memory storing program instructions thereon which, when executed by the processor, perform the functions described herein. The microcontroller 58 calculates and outputs the high speed pulse width modulation (PWM) command signal to PWM driver 60 to set a duty cycle for powering motor 32. More specifically, motor 32 is powered not by a continuous direct current but rather by a rapid series of voltage pulses (e.g., 165 volts DC). Each pulse is part of a cycle having an "on" portion and an "off" portion. The pulses are modulated in width (duration) over the cycle to deliver a greater or lesser amount of energy to motor 32 to increase or decrease the speed of motor 32. For each cycle, the duty or "on" portion can be expressed as a percentage of the cycle. The duty cycle in this sense ranges from 0% (no on pulse) to 100% (pulse on fully throughout the cycle). Microcontroller 58 outputs the PWM command signal to PWM drive 60, which provides the PWM drive signal to the gate of IGBT switch 62 to cause the IGBT 64 to turn on and off according to the frequency and duty cycle established by the PWM command signal. Specifically, IGBT Switch 64 turns on when the duty cycle is on (corresponding to pulse delivery to motor 32) and turns off when the duty cycle is off (corresponding to no pulse delivery to motor 16). Flyback diode 64 bridges the motor 16 to freewheel during the off portion of the duty cycle while blocking potentially damaging voltage generated by the motor 32.

In operation, trigger 42 is activated (e.g., pulled), which causes trigger sense circuit 42A to signal microcontroller 58 to output the PWM command signal to PWM driver 60 to cause IGBT switch 62 to turn on and off at the commanded frequency and duty cycle to cause current flow through motor 32.

The duty cycle of the PWM command signal may be calculated by microprocessor 58 before or while being output based on various inputs. Microcontroller 58 receives a signal from the spray setting input 40 (such as a potentiometer) which is set to indicate a pressure, motor speed, or other parameter setting desired by the user. In some cases, the duty cycle of the PWM command signal is based on the signal received by microcontroller 58 from the spray setting input 40 indicating the parameter setting. For example, a higher setting of the spray setting input 40 can correspond to a user desire for greater fluid pressure output from pump 24 (which requires a correspondingly higher duty cycle to cause a higher motor 32 speed), while a lower setting of spray setting input 40 can correspond to a user desire for lesser fluid pressure output from pump 24 (which requires a correspondingly lower duty cycle to cause a lower motor 32 speed).

Additionally or alternatively to the trigger 42 and trigger sense circuit 42A, the sprayer 10 can include a pressure sensor 70 which can be a pressure transducer or pressure switch (e.g., in non-handheld versions) that measures the pressure anywhere along the fluid line between the output of the pump 24 and the nozzle 22. Microcontroller 58 could start delivering the PWM command signal to PWM driver 60 to start motor 32 when the pressure within the fluid line, as indicated by the pressure sensor 70, falls below a low pressure threshold. Likewise, microcontroller 58 could stop delivering the PWM command signal to PWM driver 60 to stop motor 32 when the pressure within the fluid line, as indicated by the pressure transducer, rises above a low pressure threshold. As alternatives to stopping and starting, microcontroller 58 could increase or decrease the duty cycle of the PWM command signal to increase or decrease pressure to maintain a preferred level corresponding to spray setting input 40. Fluid may be released from the fluid line (e.g., as an atomized spray) when a mechanical valve in the fluid line opens, thereby lowering the pressure and triggering microcontroller 58 to turn on (or accelerate) motor 32 as described. The threshold(s) may be dynamically set based on the spray setting input signal to the microcontroller 58 from spray setting input 40.

Current flowing through motor 32 can cause several problems. If the current and voltage are too high, then instances of ring fire can occur wherein current arcs between the trailing edge of the brush and the rotating commutator of motor 32, which significantly reduces brush life or creates a short circuit around the commutator. Also, excessive current through motor 32 generates heat, particularly on startup when motor 32 is accelerating. Higher heat can raise the coefficient of friction of the brush, increasing wear. Heat rise can also trip internal thermal fuses of motor 32 or other components. Once a motor thermal trip occurs, the user has to wait until the motor cools down (which may be on the order of 30 minutes) before spraying can be resumed. Various features are provided to limit ring fire and heat rise, as further discussed herein.

Current feedback circuit 66 monitors current through current sense resistor 68 and provides a current feedback signal to microcontroller 58. In steady state operation, microcomputer 58 uses the current feedback signal in conjunction with the spray setting input signal and a proportional and integral control loop algorithm to keep the peak and RMS current through the motor 32 at or below a predetermined current level. That current level can be at or just below the maximum continuous RMS current the motor 32 can handle without overheating (which due to the benefits achieved using the techniques of the present disclosure can be materially higher than the maximum continuous RMS current for which the motor 32 is rated). Current feedback circuit 66 includes current sense resistor 68, which produces a current sense voltage as in function of current from IGBT switch 62 that flows through current sense resistor 68 to ground. The current feedback signal provided by current feedback circuit 66 to microcontroller 58 is based on the current sense voltage. Microprocessor 58 calculates the length of on time for each PWM cycle to maintain adequate RMS current at or below the predetermined current level. The microcontroller 58 may be programmed to increase or decrease the duty cycle (on time) to maintain the current through the motor 32 at or near the predetermined current level. In one embodiment, microcontroller 58 is programmed to maintain the current at a first Arms level during steady state operation such that the duty cycle is increased if the current falls below the first Arms level by a predetermined amount (e.g. 0.1 Arms) and the duty cycle is decreased if the current rises above the first Arms level by a predetermined amount (e.g. 0.1 Arms). In some cases, the predetermined current level may only function as upper limit so as to limit the duty cycle when the current exceeds the predetermined current limit but not otherwise increase the duty cycle based on a measured current. Alternatively, the set level can be, for example, in a range between a low Arms level and a high Arms level. Modulating the duty cycle to limit excessive current may be particularly useful when motor 32 is already accelerated to a functional speed for spraying, but a greater level of current is typically needed on startup to accelerate motor 32. Mitigation of the previously mentioned issues during startup are further discussed herein.

Figure 3:
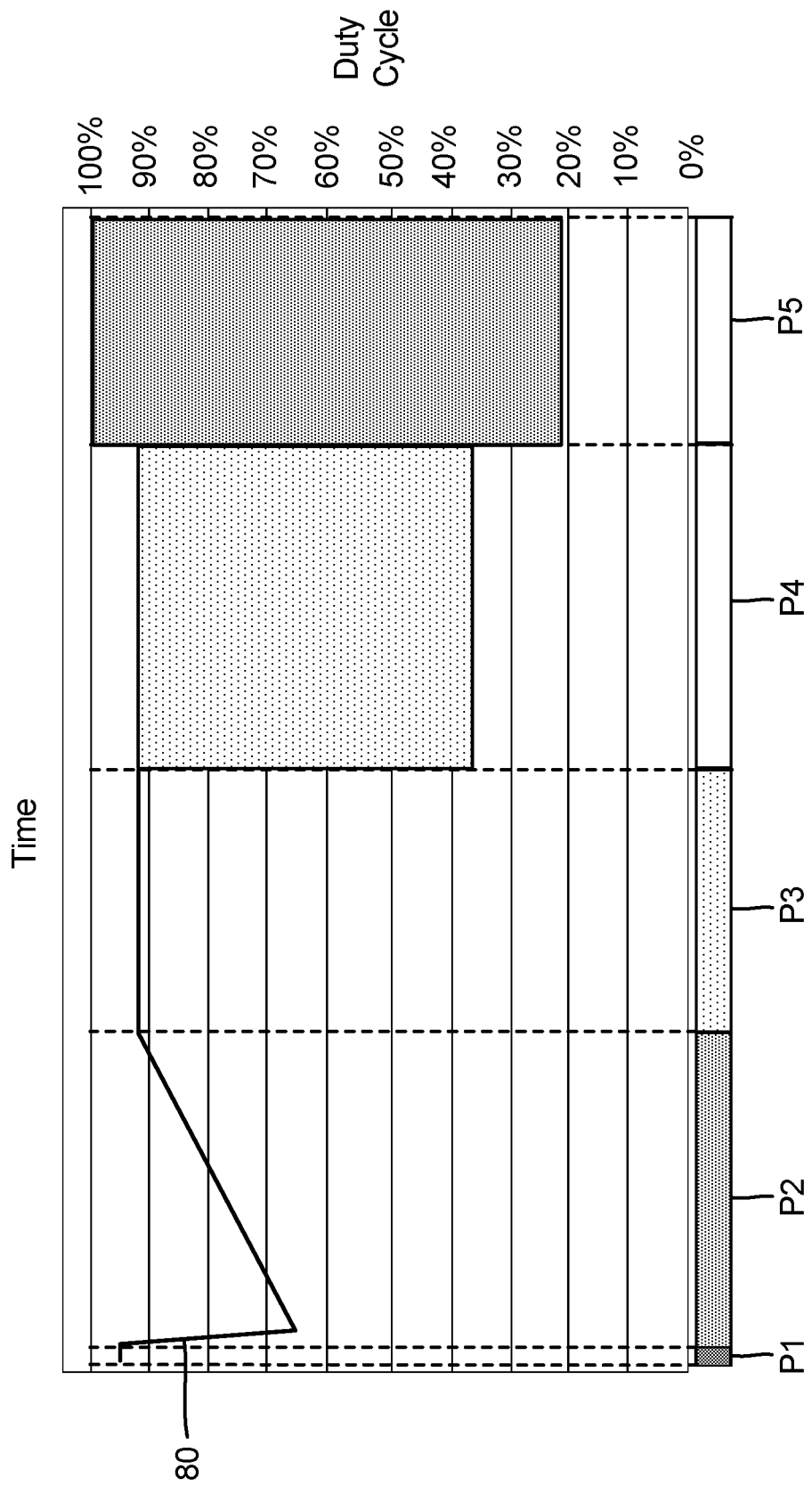
FIG. 3 is a chart demonstrating different phases of operation of the electric motor of the handheld paint sprayer.

FIG. 3 shows a chart demonstrating different phases of operation for motor 32 driven by a pulse width modulated signal corresponding to the pulse width modulation command signal output by the microcontroller 58. Duty cycle level 80 indicates the programmed duty cycle across various phases P1-P5 of the pulse width modulation command signal. First-fourth phases P1-P4 are different parts of a startup sequence while fifth phase P5 is a steady state phase of indefinite duration (i.e. as long as trigger 42 is pulled). First-fourth phases P1-P4 of the startup sequence are repeated for each trigger 42 pull or other activation of motor 32 from a dead stop. Specifically, first-fourth phases P1-P4 of the startup sequence are intended to accelerate motor 32 from a stopped condition to a fully or nearly fully accelerated condition (e.g., accelerated to the speed corresponding to the setting of the spray setting input 40).

The first phase P1 is a kick start phase in which a relatively high duty cycle pulse train is delivered to motor 32. Motor 32 is typically not in motion during first phase P1, or at least at the start of phase P1, but the pulses during phase P1 begin to establish the electromagnetic field that will drive motor 32. The duty cycle may be constant at a first level throughout first phase P1. The first level may be greater than 85%. The first level may be greater than 90%. The first level may be greater than 92%. Moreover, the first level may be less than 100%, and in some cases may be less than or equal to 96%. The first level may be within the range 90-96%. The first level may be 95%. First phase P1 may be less than 10, or 5, or 2 milliseconds (but greater than zero) in duration. In some cases, first phase P1 is between 0.01-2.0 milliseconds. In some cases, first phase P1 is 1.0 millisecond.

The current through motor 32 during first phase P rapidly increases, and may be 20 Arms or higher by the end of first phase P1. This trajectory for current level would be too high to continue, as higher current risks ring fire, excessive heat generation, and demagnetizing motor 32. Therefore, the duty cycle is decreased by microcontroller 58 for second phase P2. Second phase P2 may be considered a wave shaping phase because the decrease in duty cycle decreases the current level profile through motor 32, transitioning from an increasing trajectory at the end of first phase P1 to a leveling off or decaying trajectory soon after the start of second phase P2.

The duty cycle during the second phase P2 is maintained below the duty cycle level of first phase P1. As shown, the duty cycle during second phase P2 changes throughout phase P2. Specifically, the duty cycle ramps up, in this case linearly. The duty cycle during second phase P2 may start out as less than 80%, 75%, or 70%, but greater than 50%, 55%, 60%, or 65%. The duty cycle during second phase P2 may start out as between 60-70%. The duty cycle during second phase P2 may start out as 66%. The duty cycle during second phase P2 may end at less than 95%, 90%, or 85%, but greater than 70%, 75%, 80%, or 85%. The duty cycle during the second phase P2 may end at between 85-95%. The duty cycle during second phase P2 may end at 92%. Second phase P2 may be longer than first phase P1. Second phase P2 may be greater than 5 or 8 milliseconds but less than 20 or 15 milliseconds. In some cases, second phase P2 is between 9-11 milliseconds. In some cases, the second phase P2 is 10 milliseconds.

Third phase P3 is a speed control phase in which the duty cycle is constant at a predetermined level. The current through motor 32 is self limited to some degree because motor 32 has accelerated, although not to full speed, and motor 32 continues to accelerate through third phase P3. The current through motor 32 is used more efficiently for acceleration work in this phase and results in less heat generation. The duty cycle in the third phase P3 is constant through third phase P3. The duty cycle during third phase P3 may be less than the duty cycle of first phase P1. The duty cycle during third phase P3 may be greater than 90%, or 85%. The duty cycle in third phase P3 may be greater than 90% and less than 100%. The duty cycle during third phase P3 may be 92%. Third phase P3 may be longer than first phase P1. Third phase P3 may be the same duration as second phase P2. Third phase P3 may be greater than 5 or 8 milliseconds but less than 20 or 15 milliseconds. In some cases, third phase P3 is between 9-11 milliseconds. In some cases, third phase P3 is 10 milliseconds. It is noted that second and third phases P2, P3 could be combined (or third phase P3 eliminated) such that the duty cycle increases (e.g., linearly) through both phases with the starting and ending duty cycle levels discussed in connection with second phase P2.

The duty cycle through fourth phase P4 is based on the spray setting input 40. For example, if the user has input a setting that corresponds with 50% duty cycle (i.e. 50% power), then microcontroller 58 causes the duty cycle to be 50% throughout fourth phase P4. As such, the duty cycle through fourth phase P4 is variable based on user input. However, ring fire and overheating are still concerns at this phase, and therefore the duty cycle has an upper limit regardless of the current spray setting input 40 setting. The upper limit can be 95%, or 92%. As such, if the user set the current spray setting input 40 setting to a level which would correspond to 97% duty cycle, then the duty cycle for fourth phase P4 would be the upper limit (e.g., 92%), not 97%. Fourth phase P4 may be longer than any of the first, second, or third phases P1, P2, P3 (individually or collectively). Fourth phase P4 may be greater than 20, 30, or 50 milliseconds but less than 85, 90, or 100 milliseconds. In some cases, Fourth phase P4 is between 75-85 milliseconds. In some cases, fourth phase P4 is 82 milliseconds. It is expected that motor 32 may not be spinning at a speed which corresponds to the steady state speed for the setting provide by spray setting input 40 at the beginning of fourth phase P4, but it is expected that motor 32 will be spinning at that speed by the end of fourth phase P4. In some embodiments, the duration of fourth phase P4 may be dependent on the acceleration of motor 32 or a feedback parameter. For example, microprocessor 58 may only transition from fourth phase P4 to fifth phase P5 when motor 32 speed reaches a level that corresponds with the setting from current spray setting input 40 or when the current through motor 32 is at or crosses a threshold level.

Phase P4 could be longer than 100 ms in other embodiments, such as embodiments using a slightly larger motor or a motor that cannot handle as much current, or a drive and pump system with more mass. In those embodiments, it could take longer to fully accelerate the motor & drive system to sprayable pressures.

Fifth phase P5 corresponds to a steady state phase in which the PWM command signal is modulated based on the setting from current spray setting input 40 and the predetermined current level. In some cases, the current duty cycle will be set at whichever of the current spray setting input 40 setting and the predetermined current level dictates a lower duty cycle at the particular moment. In some cases, the duty cycle will be maintained at the current spray setting input 40 as long as the predetermined current level is within acceptable limit(s), but if the sensed current is beyond the predetermined current level (e.g., over a threshold, such as the first Arms level or outside a Arms range), then microcontroller 58 will reduce or otherwise change the duty cycle to restore the level of the current through motor 32 to the predetermined current level. If the current level through motor 32 is within the predetermined current level, then microcontroller 58 bases the duty cycle on the current spray setting input 40 setting until there is a change in the current level that deviates from the predetermined current level. Limiting the duty cycle based on comparing the sensed current through motor 32 (as represented by the current feedback signal from current feedback circuit 66) to the predetermined current level may only be implemented by microcontroller 58 in fifth phase P5, and accordingly may not be performed in the first-fourth phases P1-P4. This is because the current will likely rise well above the predetermined current level during the startup sequence but should decay to, or below, the predetermined current level by the end of the startup sequence.

Steady state phase P5 may extend indefinitely, until the trigger 42 or other activator is deactivated, at which point microcontroller 58 discontinues the PWM command signal, which causes IGBT switch 62 to remain open and current through motor 32 to cease.

Cycle frequency of the duty cycle as output by the microcontroller 58 and/or the operational switching frequency of the IGBT switch 62 may change between the startup first-fourth phases P1-P4 and the steady state fifth phase P5. For example, the cycle frequency may be at a first frequency during startup first-fourth phases P1-P4 and at a second frequency during steady state fifth phase P5. The second frequency may be greater than the first frequency. The second frequency may be at least 10 kHz greater than the first frequency. The first frequency may be less than 20 kHz while the second frequency may be greater than 20 kHz. The first frequency may be 16 kHz while the second frequency may be 32 kHz. The change in cycle frequency balances the heat production and responsiveness of the algorithm for limiting current within motor 32. For example, a higher switching frequency is more responsive to counteract increases in current through motor 32 but results in higher heat production within the switching components as they cycle at the higher rate. Therefore, switching frequency is lower at the startup phases P1-P4 because higher current is needed through first-fourth phases P1-P4 (which generates greater heat) until motor 32 is accelerated, at which point current through IGBT switch 62 is less and a higher switching frequency in the steady state fifth phase 90 can be tolerated despite increased heat production associated with higher switching frequency.

The algorithm demonstrated in FIG. 3 for motor 32 startup and steady state operation is particularly efficient at accelerating and maintaining motor 32 speed while avoiding ring fire and overheating. This increase in efficiency allows motor 32 to be smaller, which is particularly beneficial for a handheld unit that must be entirely supported by the user.

The disclosed controller offers a number of advantages, including increased HVDC motor brush life, increased motor efficiency, elimination of motor thermal trips, reduced motor heat rise, and variable spray output.

The peak and RMS current can be controlled to a range below 4 Arms and 7.3 A peak as would otherwise be typical in prior controllers using triac or SCR communication. This reduction in peak current and RMS current has two significant impacts that affect brush life. The first positive effect is reduced commutation arcing on the trailing edge of the brush between the brush and the rotating commutator bars. This effectively reduces the electrical brush wear rate from that trailing arc causing the brushes to last longer in this application. High peak and RMS currents can cause excessively fast brush wear. The current feedback coupled with the PI loop used by microcontroller 58 helps prevent excessive brush wear. The second effect is a reduction in brush heat rise and steady state operating temperature. Generally, with a temperature decrease, brushes have a lower coefficient of friction during operation which reduces the mechanical ware rate of the brush. Controller 38 can increase the amount of paint a user can spray before replacing the motor from 50 gallons of paint to more than 150 gallons, an increase of 200%.

With the addition of high voltage direct current power supply 50, current feedback circuit 66 and the PI loop used by microcontroller 58, the sprayer 10 is able to do the same amount of mechanical work but with lower RMS and peak current. With motor 32 operating at higher efficiency, less power is being wasted as heat and more is being used for work. This means paint sprayer 10 can utilize a smaller, lighter weight fractional horsepower motor taking up less space, reducing product weight and cost.

One significant issue with many paint spraying products is motor thermal trips. A user will be spraying and the motor will overheat causing an internal thermal fuse to open. A user then needs to wait 30 minutes for the motor to cool down before the user can finish the painting job. This happens because different materials can cause the sprayer to work harder due to their fluid properties. Some fluids increase the load on the motor and thus increase the peak and RMS currents the motor draws. Since controller 38 increases the efficiency of the motor, less power is wasted as heat and more is used to do work. This allows for greater loads to be applied the motor without significant variations in motor current. With the addition of the current feedback loop and PI algorithm, microcontroller 58 keeps the current below the maximum continuous current rating of motor 32. This means that no matter what materials the user places in sprayer 10, controller 38 will adapt and limit the power applied to motor 32 to ensure that motor is operating within its designed limits.

The ability to provide a variable spray setting with spray setting input 40 significantly enhances the spray performance for the user, reducing paint waste due to overspray and limiting fluid flow dramatically for an improved finish in a wide range of materials and tip sizes. This variable setting provides can provide a large number of different flow reduction operating points for the user.

The present disclosure is made using an embodiment to highlight various inventive aspects. Modifications can be made to the embodiment presented herein without departing from the scope of the invention. As such, the scope of the invention is not limited to the embodiment disclosed herein.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid sprayer comprising:
   a housing;
   a pump connected to the housing, the pump comprising a piston;
   a nozzle for spraying fluid delivered under pressure by the pump;
   a spray setting input configured to generate a user selected spray setting;
   a direct current brushed electric motor located in the housing and configured to operate the pump, wherein the motor is configured to generate a rotational output;
   a drive that converts the rotational output of the motor to a reciprocating linear motion that linearly reciprocates the piston of the pump; and
   a motor controller electrically connected to the motor to drive the motor with a pulse width modulated (PWM) signal that switches current through the motor on and off;
   wherein the motor is configured such that the motor can cause the piston to move through each of a pressure stroke and a suction stroke with the current through the motor on;
   wherein the motor controller varies a duty cycle of the PWM signal based on the user selected spray setting;
   wherein the motor controller drives the motor with the PWM signal during a start-up sequence phase of the motor, during which the motor controller causes the motor to accelerate to a functional rotational speed for spraying;
   wherein the motor controller drives the motor with the PWM signal during a steady state phase of operation of the motor, during which the motor is operating at the functional rotational speed for spraying, the steady state phase following the start-up sequence phase;
   wherein the motor controller outputs the PWM signal at a plurality of switching frequencies, and wherein each switching frequency of the plurality of switching frequencies is based on a number of pulse cycles of the PWM signal per unit time, each pulse cycle having an on portion, during which the current is provided to the motor to power rotation of the motor, and an off portion, during which the current is not provided to the motor; and wherein the motor controller is configured to output the PWM signal to have a first switching frequency during the start-up sequence phase and to output the PWM signal to have a second switching frequency during the steady state phase, wherein the second switching frequency is greater than the first switching frequency to prevent overheating.

2. The fluid sprayer of claim 1, further comprising a current feedback circuit configured to sense current through the motor and generate a current feedback signal based on the sensed current through the motor, wherein the motor controller is configured to adjust a duty cycle of the PWM signal as a function of the current feedback signal.

3. The fluid sprayer of claim 2, wherein the motor controller is configured to lower the duty cycle of the PWM based on the current feedback signal indicating that the sensed current through the motor exceeds a predetermined current level.

4. The fluid sprayer of claim 1, wherein the motor controller includes:
a power supply that converts input AC power to a DC voltage at a first motor terminal of the motor;
a semiconductor switch having a first main current carrying electrode connected to a second motor terminal of the motor, a second main current carrying electrode, and a control electrode;
a PWM driver that delivers the PWM signal to the control electrode to cause the semiconductor switch to turn on and turn off in response to the PWM signal; and
a microcontroller that controls a duty cycle of the PWM signal.

5. The fluid sprayer of claim 4 wherein the motor controller further includes:
a current feedback circuit connected to the second main current carrying electrode for producing a current feedback signal representing sensed current flow through the semiconductor switch;
wherein the microcontroller controls the duty cycle of the PWM signal as a function of the current feedback signal.

6. The fluid sprayer of claim 5, wherein the microcontroller controls the duty cycle based upon the spray setting input and the current feedback signal with a proportional-integral (PI) control loop.

7. The fluid sprayer of claim 1, wherein the fluid sprayer includes a trigger, and the motor controller controls whether the PWM signal is delivered to the motor based on a status of the trigger.

8. The fluid sprayer of claim 1, wherein the fluid sprayer includes a pressure transducer that measures fluid pressure and the motor controller controls whether the PWM signal is delivered to the motor based on the measured fluid pressure.

9. The fluid sprayer of claim 1, wherein the start-up sequence phase includes a plurality of phases of operation.

10. The fluid sprayer of claim 9 wherein the plurality of phases includes a first phase in which the PWM signal has a duty cycle of greater than 85% and less than 100%.

11. The fluid sprayer of claim 10 wherein the first phase has a duration of between 0.01 and 2.0 milliseconds.

12. The fluid sprayer of claim 10 wherein the plurality of phases includes a second phase that follows the first phase, the second phase has a duty cycle that is less than the duty cycle in the first phase, and the second phase has a duration of greater than 5 milliseconds and less than 20 milliseconds.

13. The fluid sprayer of claim 12 wherein the motor controller causes the duty cycle to ramp up during the second phase.

14. The fluid sprayer of claim 12 wherein the plurality of phases includes a third phase in which the duty cycle is constant and is less than the duty cycle in the first phase.

15. The fluid sprayer of claim 14 wherein the third phase has a duration of greater than 5 milliseconds and less than 20 milliseconds.

16. The fluid spray of claim 1, wherein during the steady state phase the motor controller modulates the duty cycle of the PWM signal based upon the user selected spray setting and a measured parameter indicative of current through the motor.

17. A method of controlling power to a motor of a fluid sprayer, the fluid sprayer comprising a housing, a pump connected to the housing and comprising a piston, a drive that converts a rotational output from the motor to a reciprocating linear motion, a nozzle for spraying fluid delivered under pressure by the pump, the motor located within the housing and which operates the pump, a spray setting input, a current feedback circuit, and a motor controller, the method comprising:
receiving a user selected pressure setting from the spray setting input;
delivering a pulse width modulated (PWM) signal which switches current through the motor on and off, wherein the motor is configured to generate the rotational output;
converting, by the drive, the rotational output from the motor to the reciprocating linear motion that linearly reciprocates the piston of the pump;
measuring current through the motor with the current feedback circuit; and
modulating a duty cycle of the PWM signal based on the user selected pressure setting and the measured current through the motor;
wherein the motor is configured such that the motor can cause the piston to move through each of a suction stroke and a pressure stroke with the current through the motor switched on; and
wherein delivering the PWM signal to the motor comprises delivering the PWM signal through a start-up sequence to accelerate the motor from a dead stop to a functional rotational speed for spraying, and wherein during the start-up sequence the duty cycle of the PWM signal is fixed in a first phase, the duty cycle is lowered relative to the first phase in a second phase of the start-up sequence, and wherein the duty cycle is ramped up from a start of the second phase to an end of the second phase such that the duty cycle is lowered at the start of the second phase relative to the end of the second phase.

18. The method of claim 17, further comprising modulating the duty cycle of the PWM signal in a steady state phase of indefinite duration, the steady state phase following the startup phase.

19. The fluid sprayer of claim 1, wherein the user selected spray setting is a user selected pressure setting.

20. A fluid sprayer comprising:
a housing;
a pump connected to the housing, the pump comprising a piston;
a nozzle for spraying fluid delivered under pressure by the pump;
a spray setting input configured to generate a user selected spray setting;

a direct current brushed electric motor located in the housing and configured to operate the pump, wherein the motor is configured to generate a rotational output;

a drive that converts the rotational output of the motor to a reciprocating linear motion that linearly reciprocates the piston of the pump; and a motor controller electrically connected to the motor to drive the motor with a pulse width modulated (PWM) signal that switches current through the motor on and off;

wherein the motor is configured such that the motor can cause the piston to move through each of a pressure stroke and a suction stroke with the current through the motor on;

wherein the motor controller drives the motor with the PWM signal during a start-up sequence of the motor, and the motor controller drives the motor with the PWM signal during a steady state sequence of the motor, the steady state sequence following the start-up sequence;

wherein the motor controller varies a duty cycle of the PWM signal based on the user selected spray setting; and wherein the motor controller limits the duty cycle of the PWM signal based on a comparison of sensed current through the motor and a predetermined maximum current level during only the steady state sequence such that the motor controller allows the sensed current through the motor to exceed the predetermined maximum current level during the start-up sequence.

* * * * *